United States Patent
Beaman

[15] 3,648,746
[45] Mar. 14, 1972

[54] CUSTOM WHEEL ADAPTER FOR TIRE CHANGING MACHINE

[72] Inventor: Clayton E. Beaman, 1119 W. Vance St., Wilson, N.C. 27893

[22] Filed: Sept. 16, 1970

[21] Appl. No.: 72,751

[52] U.S. Cl. .................................................157/1.24, 144/288 A
[51] Int. Cl. ...........................................................B60c 25/06
[58] Field of Search................144/288 A; 157/1.1, 1.17, 1.2, 157/1.22, 1.26, 1.28, 1.3, 1.33

[56] References Cited

UNITED STATES PATENTS

| | | |
|---|---|---|
| 1,538,875 | 5/1925 | Stevens...................................157/1.24 |
| 3,255,800 | 6/1966 | Strang et al............................157/1.24 |
| 3,267,977 | 8/1966 | Turpin ..............................157/1.24 X |
| 3,474,840 | 10/1969 | Scott................................157/1.24 X |

*Primary Examiner*—Granville Y. Custer, Jr.
*Attorney*—Clarence A. O'Brien and Harvey B. Jacobson

[57] ABSTRACT

A generally conical wheel holddown adapter for a tire changing machine including an internally threaded generally cylindrical sleeve extension projecting outwardly of its minor diameter end portion and a diametrically enlarged radially outwardly projecting hand wheel portion on its major diameter end portion.

7 Claims, 4 Drawing Figures

PATENTED MAR 14 1972  3,648,746

Clayton E. Beaman
INVENTOR.

BY *Clarence A. O'Brien*
*and Harvey B. Jacobson*
Attorneys

CUSTOM WHEEL ADAPTER FOR TIRE CHANGING MACHINE

Tire changing machines are provided with upper surfaces upon which the inside peripheral edge portions of vehicle wheels are adapted to abut when the vehicle wheel is displaced downwardly onto the top of the tire changing machine with the outside of the vehicle wheel facing upwardly. The machine includes an upstanding centrally disposed hold-down post provided with threads and conventionally a generally inverted frustrated cone-shaped hold-down member having a threaded bore formed axially therethrough is provided for downward threading on the hold-down post into engagement with the periphery of the center opening of the vehicle wheel disposed on the machine upwardly through which the hold-down post extends. This conventional arrangement operates adequately for a major portion of the vehicle wheels utilized on todays passenger cars and light trucks. However, "Mag" wheels are becoming increasingly popular and these wheels include wider rims and center sleeve portions which project axially from the center web of the wheel to a point almost coplanar with the outer side of the wheel. This center sleeve portion encloses the outwardly projecting spindle portion of the front wheel of a vehicle when the "Mag" wheel is mounted upon the front drum.

Because the center outwardly projecting sleeve portion of "Mag" wheels extends almost to the outer side of the wheel rim, when a "Mag" wheel is disposed on a tire changing machine with the hold-down post of the machine projecting upwardly through the center sleeve portion of the "Mag" wheel, the upper extremity of the threaded portion of the hold-down post is disposed below the upper end of the center sleeve portion of the "Mag" wheel. Of course, the greater rim width of "Mag" wheels also causes the upper end of the center sleeve portion of a "Mag" wheel to be elevated above the uppermost threads on the associated tire changing machine hold-down post. For this reason, the conventional inverted frusto-conical hold-down adapter, when it is disposed on the hold-down post with its minor diameter end portion engaged with the upper end of the center sleeve portion of a "Mag" wheel, is elevated appreciably above the uppermost threads on the hold-down post and therefore cannot be threadedly engaged with the post in order to perform its hold-down function.

Accordingly, the adapter of the instant invention includes a thin walled internally threaded sleeve portion which projects downwardly from the conical portion of the adapter and is receivable downwardly within the upper end of the center sleeve portion of a "Mag" wheel disposed on a tire changing machine. Of course, the axial extent of this downwardly projecting end wall sleeve portion is sufficient to enable the internal threads of the sleeve portion to be threadedly engaged with the threads on the hold-down post.

It is accordingly the main object of this invention to provide a tire changing machine hold-down adapter which will be capable of functioning in conjunction with existing tire changing machines when the latter are utilized to change tire casings on the increasingly popular "Mag" wheels.

Another object of this invention, in accordance with the immediately preceding object, is to provide a hold-down adapter that may also be utilized in conjunction with conventional steel vehicle wheels thereby necessitating that only one wheel adapter be utilized for both conventional steel wheels and "Mag" wheels.

A final object of this invention to be specifically enumerated herein is to provide a wheel hold-down adapter for tire changing machines in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
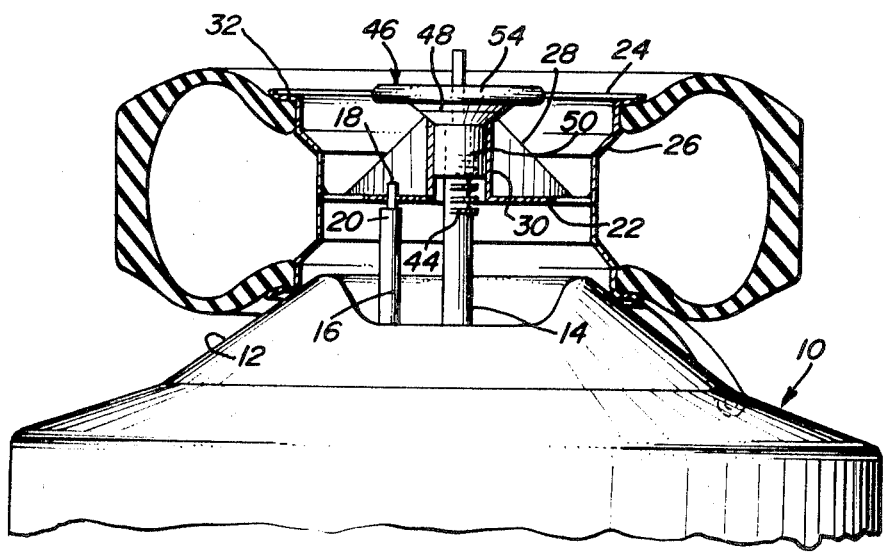
FIG. 1 is a fragmentary side elevational view of the upper portion of a conventional tire changing machine such as the Coats Model 10—10 tire changing machine with a wide "Mag" wheel disposed thereon and the adapter of the instant invention in operative position holding the "Mag" wheel on the top of the tire changing machine.
Figure 2:
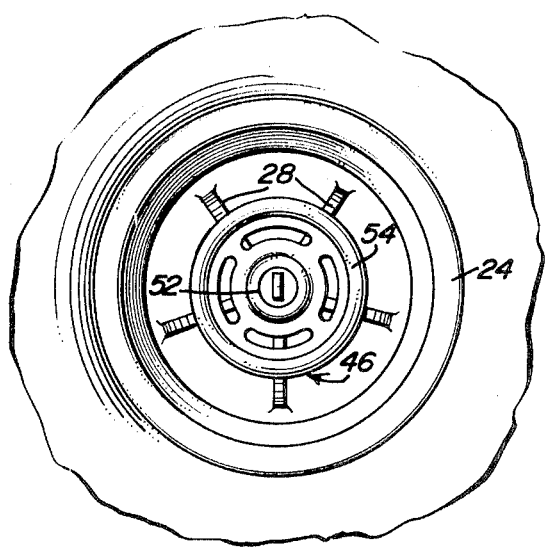
FIG. 2 is a fragmentary top plan view of the assemblage illustrated in FIG. 1.
Figure 3:
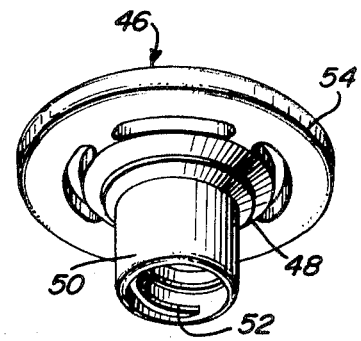
FIG. 3 is a perspective view of the adapter of the invention.

Referring now more specifically to the drawings the numeral 10 generally designates a tire changing machine such as the Coats Model 10—10 tire changing machine. The machine 10 includes an upper central portion 12 from which an upstanding rotary hold-down post 14 projects. The central portion 12 is adapted to have the underside periphery of a horizontally disposed vehicle wheel supported therefrom in the manner illustrated in FIGS. 1 and 4 of the drawings and the machine 10 further includes an indexing post 16 with a diametrically reduced upper end 18 for reception through one of the mounting stud openings 20 formed in the center web 22 of the vehicle wheel 24 illustrated in FIG. 1.

The wheel 24 includes a wide rim portion 26 and the center web 22 is generally centered relative to the axial extent of the rim portion 26. However, the wheel 24 is cast and includes integral spokes 28 which radiate outwardly from a center sleeve portion 30. The sleeve portion 30 projects outwardly from the outer side of the web 22 and terminates but a short distance from the transverse plane containing the periphery of the outer side 32 of the wheel 24.

Figure 4:
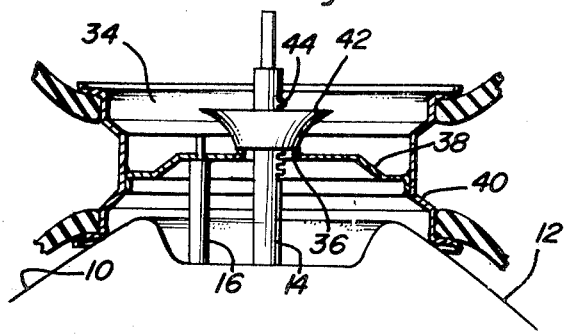
FIG. 4 is a fragmentary side elevational view similar to FIG. 3 but illustrating a conventional hold-down adapter being utilized to hold a conventional width steel wheel on the machine.

With attention now invited more specifically to FIG. 4 of the drawings, it may be seen that a narrow conventional steel wheel 34 is mounted on the central portion 12 with the hold-down post 14 projecting upwardly through the central opening 36 in the web 38 of the wheel 34. The rim 40 of the wheel 34 is not as wide in an axial direction as the rim portion 26 of the wheel 24 and accordingly, the web 38 is not elevated as far above the central portion 12 of the machine 10 as the web 22 of the wheel 24. Further, the web 38 of the wheel 34 does not include the central sleeve portion 30 which is provided on the wheel 24 and accordingly, a conventional inverted frusto-conical hold-down adapter 42 having an internally threaded bore (not shown) may be displaced downwardly over the upper end of the post 14 and threaded downward on the threads 44 formed on the post 14.

Inasmuch as the threads 44 extend both above and below the web 38 of the wheel 34, the adapter 42 may be threaded downward on the post 14 until its lower minor diameter end abuts the inner central periphery of the web 38 defining the opening 36 through which the post 14 projects. Thus, the wheel 34 may be held stationary relative to the machine 10 so that the necessary tire changing operations may be carried out on the wheel 34 by the machine 10.

However, with attention now invited more specifically to FIGS. 1 and 4 of the drawings, it may be observed that the hold-down adapter 42 could not be used to hold the wheel 24 down on the machine 10 inasmuch as the upper extremity of the threads 44 is disposed below the upper end of the central sleeve portion of the wheel 24 and the hold-down adapter 42 would therefore abut the upper end of the sleeve portion 30 while still being spaced above the threads 44.

In order to alleviate this problem, the hold-down adapter of the instant invention which is referred to in general by the reference numeral 46 includes an inverted frusto-conical portion 48 provided with a thin walled sleeve portion 50 which is internally threaded as at 52 and the sleeve portion 50 projects downwardly from the minor diameter end portion of the frusto-conical intermediate body portion of the adapter 46 so as to be receivable downwardly in the sleeve portion 30 for threaded engagement with the threads 44 on the post 14. The adapter 46 further includes a diametrically enlarged radially outwardly projecting handwheel portion 54 on its major diameter end portion which may of course be utilized to tighten the adapter 46 down on the central sleeve portion 30 of the wheel 24.

It will be noted that the surfaces of the frusto-conical portion 48 of the adapter 46 are inclined more than 45° relative to the center line of the adapter 46 and thus, the tendency of that portion of the frusto-conical portion 48 of the adapter 46 engaged with the upper end of the sleeve portion to spread the latter is maintained at a minimum. On the other hand, attempts have been made to adapt the hold-down adapter 42 for use with "Mag" wheels such as the wheel 24 by lengthening the minor diameter end portion of the adapter 42 so that the latter may also "reach" downward into the center sleeve portion 30 of the wheel 24. However, this extension of the minor diameter end portion of the adapter 42 has not proved successful inasmuch as the outer surfaces of the extended portion of the minor diameter end of the adapter 42 almost parallel the longitudinal centerline of the adapter 42 and thus have a great tendency to spread the sleeve portion 30 instead of applying an axial downward thrust on the sleeve portion 30 as such a modified adapter 42 is threaded downward on the hold-down post 14.

The adapter 46 has its sleeve portion 50 constructed of metal and the frusto-conical portion 48 and hand wheel portion 54 are constructed of glass fiber impregnated plastic resin with the frusto-conical portion 48 bonded to the upper end portion of the sleeve portion 50.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A wheel hold-down adapter for use on the center hold-down post of a tire changing machine, said adapter defining a body including an inverted truncated cone-shaped upper portion, a concentric generally cylindrical lower extension portion projecting downwardly from the lower minor diameter end of said upper portion, said body having a central upstanding threaded bore formed therethrough, the outside diameter of said extension being at least slightly smaller than the diameter of the central openings in conventional steel vehicle wheels and the inside diameter of the central sleeve portions of custom "Mag" wheels.

2. The combination of claim 1 wherein said extension portion is constructed of metal and includes an upper end portion extending upwardly through said upper portion and to which said upper portion is secured.

3. The combination of claim 2 wherein said upper portion is constructed of glass fiber reinforced resin.

4. The combination of claim 1 wherein the upper major diameter end of said upper portion includes a radially outwardly projecting and circumferentially extending enlargement defining a hand wheel.

5. The combination of claim 4 wherein said extension portion is constructed of metal and includes an upper end portion extending upwardly through said upper portion and to which said upper portion is secured.

6. The combination of claim 5 wherein said upper portion and hand wheel are constructed of glass fiber reinforced resin.

7. The combination of claim 1 wherein the conical surfaces of said cone-shaped upper portion are inclined more than 45° relative to the centerline of said adapter.

* * * * *